United States Patent
Vemuri et al.

(10) Patent No.: US 8,037,040 B2
(45) Date of Patent: Oct. 11, 2011

(54) GENERATING CONTINUOUS QUERY NOTIFICATIONS

(75) Inventors: Srinivas S. Vemuri, Santa Clara, CA (US); Bipul Sinha, Foster City, CA (US); Amit Ganesh, San Jose, CA (US); Subramanyam B. Chitti, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 410 days.

(21) Appl. No.: 12/189,078

(22) Filed: Aug. 8, 2008

(65) Prior Publication Data

US 2010/0036831 A1 Feb. 11, 2010

(51) Int. Cl.
*G06F 17/30* (2006.01)
(52) U.S. Cl. .......................... 707/702; 707/713; 707/736
(58) Field of Classification Search .......... 707/688–690, 707/694–696, 700, 702, 739, 758, 760, 769, 707/773
See application file for complete search history.

(56) References Cited

U.S. PATENT DOCUMENTS

| 5,768,532 | A | 6/1998 | Megerian |
|---|---|---|---|
| 6,366,915 | B1 | 4/2002 | Rubert et al. |
| 2002/0042789 | A1 | 4/2002 | Michalewicz et al. |
| 2002/0128897 | A1* | 9/2002 | Nelson et al. ................... 705/10 |
| 2002/0169747 | A1 | 11/2002 | Chapman et al. |
| 2003/0144980 | A1 | 7/2003 | Holmgren |
| 2004/0205048 | A1 | 10/2004 | Pizzo et al. |
| 2005/0039049 | A1 | 2/2005 | Chang et al. |
| 2005/0055384 | A1* | 3/2005 | Ganesh et al. ................. 707/202 |
| 2005/0091287 | A1 | 4/2005 | Sedlar |
| 2006/0206532 | A1* | 9/2006 | MacLaurin ................... 707/200 |
| 2008/0215528 | A1 | 9/2008 | Sedlar |
| 2010/0036803 | A1 | 2/2010 | Vemuri et al. |

OTHER PUBLICATIONS

N. Gehani et al., "OdeFs: A File System Interface to an Object-Oriented Database", At&T Bell Laboratories, New Jersey, 1989.

* cited by examiner

*Primary Examiner* — Cam-Linh Nguyen
(74) *Attorney, Agent, or Firm* — Hickman Palermo Truong & Becker LLP (57) ABSTRACT

Techniques are described to allow a query to be registered as a persistent stored entity within the database, and to generate notifications as and when the query result changes continuously as long as the query continues to be registered with the database. According to one aspect, for a table referenced in a query, a filter condition is generated based, at least in part, on a predicate of the query. Then, the database server determines whether the filter condition is satisfied by either a before image of a row, or an after image of the row, that was modified by a transaction. If the filter condition is satisfied by either the before image or the after image, then the query is added to a first set of queries whose result sets may have been affected by the transaction. From among the first set of queries, a second set of queries that have result sets that were actually affected by the transaction is determined. Notifications are then sent based on the second set of queries.

28 Claims, 4 Drawing Sheets

GENERATING CONTINUOUS QUERY NOTIFICATIONS

RELATED CASES

The present application is related to U.S. patent application Ser. No. 10/866,344, entitled "Query-Based Invalidation Subscription", filed Jun. 10, 2004.

The present application is also related to U.S. patent application Ser. No. 12/326,822, entitled "AN ADAPTIVE FILTER INDEX FOR DETERMINING QUERIES AFFECTED BY A DML OPERATION", filed Dec. 2, 2008.

FIELD OF THE INVENTION

The present invention relates to database systems and, more particularly, to determining how changes made to a database affect the results returned by queries.

BACKGROUND

To determine how changes made to a database have affected the results returned by a particular query, the particular query may be resubmitted, and the results produced by a previous execution of the query can be compared with the results produced by the current execution of the query. Unfortunately, the process of re-submitting a query and then comparing previous and current results may be tedious and time consuming, especially when many queries are involved. Further, in many circumstances, users would like to know about query result changes continuously, AS and WHEN the query result changes occur.

A variety of techniques may be used to inform users of query result changes. For example, according to a "trigger" approach, a trigger is created on each of the tables referenced in the queries of interest. One implementation of the trigger approach is described in U.S. Pat. No. 6,405,191, entitled "Publish and Subscribe in a Database System". Inside the body of the trigger, the query is evaluated to detect if the result set has changed. For the trigger approach to be feasible, the trigger has to know the rows changed and the contents of the changed rows (before and after images). Because the after image is desired, the trigger approach will typically be implemented using triggers that fire after the change has been applied (an "after DML" trigger). However, a COMMIT trigger may also be used in conjunction with DML triggers. Specifically, DML triggers may be used to capture and buffer the row changes, and the COMMIT trigger may be used to send the buffered changes to the interested users.

Unfortunately, the trigger approach has several problems. For example, separate triggers have to be defined for each table that is being monitored for changes. Thus, one thousand triggers would be required to monitor one thousand tables. In addition, the trigger body execution has a significant cost since it is akin to executing a PL/SQL procedure. In the presence of a large number of queries, evaluating all the queries can be prohibitively expensive. This can significantly hamper the throughput (and increase latency) of OLTP transactions.

There are also visibility issues with DML triggers since the DML triggers are invoked while the transaction is still active. Invoking the DML trigger while the transaction is still alive may cause correctness issues, since the state of the database when the transaction is active may be significantly different compared to the state of the database at the time the transaction commits, thereby leading to incorrect evaluations. For the evaluation to be correct, the changes performed within a transaction have to be considered atomic as of the COMMIT POINT of the transaction. While visibility issues may be partly addressed by the use of COMMIT triggers, the problems of performance and scalability would still remain.

According to a log mining approach, logs may be used as a source of changes. The changes identified from the logs may be used to evaluate query result changes. The log mining approach can be implemented on top of a commercial DBMS using the log mining tools available. However, there is still a great cost to the log mining approach, both in terms of performance/scalability as well as complexity of logic.

Specifically, log mining has significant I/O costs, since log mining involves scanning redo logs to obtain log records. Every transaction has to be scanned, causing a great deal of I/O. Further, evaluating query result changes is also non-trivial, and evaluating every query will have severe scalability issues.

In a common usage scenario, the events of interest (i.e the query result changes) occur at a frequency much lower than the frequency of OLTP transaction commits i.e a large majority of transactions may not affect any query results at all. Moreover, even if a transaction is "interesting", the transaction may affect only one or a few of possibly many thousands of registered queries. Checking query result changes for all possible queries for all possible transactions across all DML changes is not likely be a scalable solution.

Based on the foregoing, it is clearly desirable to provide a mechanism for identifying query result changes that avoids the scalability and performance issues of the trigger and log mining approaches.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview: Generating Continuous Query Notifications

Continuous Queries (also referred to as Active Queries) is a feature by which applications or end users can "register"

interest on certain Queries and receive notifications when the result set of the query changes. Usually, these queries represent conditions of interest specific to the application domain (e.g bank balance of a given user falls below 100 OR a new order item is inserted for a given customer). The receipt of the notification would then represent the fact that an event of interest for the application has occurred.

Techniques are described herein to allow a query to be registered as a persistent stored entity within the database, and to generate notifications AS and WHEN the query result changes continuously as long as the query continues to be registered with the database. These techniques can be implemented in a commercial Database Management System on which OLTP transactions and queries (in standard SQL) are performed—in order to figure out when a transaction COMMIT on the DBMS causes a result set change in one or more registered queries.

As shall be described in greater detail hereafter, queries of interest are registered with the database: the registration can include a DDL or some other interface whereby the query of interest is presented to the database. In one embodiment, the process of query registration is combined with the query execution so that during registration, the initial set of query results can be retrieved by the application. As an example, a caching application might retrieve the initial result set of a query as part of the registration (and first execution) and use the subsequent notifications (or invalidations) to keep the result set consistent. In one embodiment, during the time of the registration, the application also specifies a notification callback which is to be invoked when the query result changes. For example, the notification callback can be a PL/SQL procedure.

The techniques described herein may be used to generate query result changes for the following class of queries, defined as "SELECT-PROJECT-INNER-JOIN queries".
(1) The query is allowed to consist of any of the simple scalar datatypes (number, varchar2, timestamp etc)
(2) The query does not contain any references to PL/SQL stored procedures or any context sensitive operators that can cause non-deterministic behavior. These include references to SYSDATE or SYSTIMESTAMP or application context (USERENV( ) operator)
(3) Subquery blocks are not allowed and the only joins allowed are inner Equi Joins.

In addition, the techniques may be applied to queries that can be rewritten into SELECT-PROJECT-INNER-JOIN queries.

Terminology/Concepts Used

For the purpose of explanation, the following terms are used hereafter in describing certain embodiments of the present invention:

COMMIT_TIME: Also known as SCN. A unique number assigned at the time of commit of a transaction. Transactions that commit in the future (and have dependencies with an earlier transaction) must commit at a higher SCN.

SNAPSHOT CONSISTENT READ: Also known as statement level read consistency. This mode of read guarantees that ALL the data returned by a query (or a query that occurs as part of a DML like update) corresponds to a single consistent state of the database (i.e the same SCN)

Flashback QUERY: By default, queries pick a recent SCN as the snapshot to be used for returning data. In flashback mode, the database server can decorate tables within the query with explicit SCNS such that each table within the query can be seen as of a separate SCN.

FIXED_TABLES or FIXED_VIEWS: Relational schema super-imposed on an in memory data structure such as an array or a linked list. Having the super imposed relational schema allows the data from the in memory data structure to be manipulated using standard SQL (e.g Selection, projection, joined with other tables etc). The row source for a fixed table/fixed view would consist of iterating over the in memory data structure (much like a table scan) and returning the members of the data structure as column values.

TABLE_LOCKS (DML Locks): Table locks are acquired in a DBMS for DML statements (such as insert, update, delete) in Row Exclusive Mode to prevent conflicting operations from DDL operations (such as ALTER, DROP etc). Multiple DML statements can concurrently acquire the Table Locks in Row Exclusive Mode but a DDL has to wait for the currently active transactions to either commit or rollback.

In memory Global Locks (known as enqueues within Oracle Terminology): these enable us to serialize concurrent threads across nodes of a clustered database server.

Query Result Change

For the purpose of determining transactional query result changes, the techniques described herein assume that the registered queries are snapshot consistent queries. Specifically:
(a) The query sees a snapshot consistent result set (also referred to as consistent Read) where all data returned by the query corresponds to a commit point (also system commit number or SCN) within the database.
(b) The query result set is considered to be changed as a result of transaction TX with commit SCN (TXS) if and only if the result of the query at Snapshot (TXS-1) and at snapshot (TXS) are different i.e the set of tuples returned at the two snapshots mentioned above are different.

With some simple extrapolation, the notion of query result change can be extended to cover sagas (or batches or sequences) of multiple transactions (without any gaps): such that the query is considered to have changed if the result at SCN prior to commit scn of the first txn in the chain and after the commit SCN of the last one in the chain are different.

Registration Phase

According to one embodiment, various operations are performed in each of two processing phases: (1) Registration Phase and (2) Transaction evaluation phase. Registration Phase refers to when the query is registered with the database. As part of the registration, a queryId is assigned to the queries. The queryId is sent back during subsequent invalidations for the same query.

During registration, the database server extracts the predicates from the query and creates a reverse mapping between the predicates and the queryId. The predicates extracted from the query are referred to as Filter Conditions.

For example, consider the following query (Q1):
SELECT col1, col2
from T
where col3=10 and col4>100, In query Q1, the relevant predicate is (col3=10 and col4>100). Assuming the queryId of query Q1 is 1, during the registration phase of query Q1 the database server would create a mapping (col3=10 and col4>100)→queryId: 1

Also note that in order for the query result to change, in addition to the predicate being satisfied, the values of the columns col1 and col2 must change. In order to capture this, the database server enhances the filter condition to include this information (col3=10 and col4>100) & (CHG_COL(col1) OR CHG_COL(col2)).

In this example, CHG_COL is an abstract function which depends on the kind of DML performed and the nature of the transaction. CHG_COL(col) returns TRUE for those columns that are modified as part of a DML and FALSE for those columns which are NOT. Note that in the case of an INSERT or DELETE operation, all the columns are implicitly considered to be changed, so CHG_COL(col) will be TRUE for all columns. In the case of an update CHG_COL would be true only for the columns that were actually updated.

The columns to which the CHG_COL( ) function is applied in a filter condition are referred to herein as the "change columns" of the filter expression. In general, the change columns of the filter expression for a particular table referenced by a particular query will include all columns of that particular table that are listed in the select clause of the query, and all columns of the particular table that are listed in the predicates of the particular query.

Registering Queries that Include Joins

A registered Query can include JOINS. For example, consider the following query (Q2) that selects all order line items for Customer Joe since Jan-2007:
select ol.item_qty, ol.item_name
from orders O, order_lines OL, customers C
where C.name='Joe' and C.customer_id=O.customer_id and
    O.order_date>'Jan-2007' and
O.order_id=OL.order_id For the purpose of explanation, assume that the customer id of the customer Joe is 10. Also, assume that the order numbers 55, 56 and 57 have been placed for customer Joe since Jan-2007, and that the initial state of the tables is as follows
Customer:
(customer_id=10, 'Joe')
(customer_id=100, 'John)
Orders
(customer_id=10, order_id=55, order_date='1 Feb. 2007')
(customer_id=10, order_id=56, order_date='2 Feb. 2007')
(customer_id=10, order_id=57, order_date='3 Feb. 2007')
(customer_id=100, order_id=60, order_date=' . . . ')
Order_Lines
(order_id=55, item_name='IPOD NANO', item_qty=4)
(order_id=56, item_name='DVD PLAYER', item_qty=1)
(order_id=57, item_name='DIGITAL CAMERA, item_qty=1)

Based on this initial state of the tables, the initial result of the query Q2 at the time of registration is therefore:
(item_name='IPOD NANO', item_qty=4)
(item_name='DVD PLAYER', item_qty=1)
(item_name 'DIGITAL CAMERA', item_qty=1)

In response to registration of query Q1, the database server defines filter conditions on all the tables involved in the query. When a query involves JOINS, the database server can choose to instantiate the JOIN predicates within the query, provided such predicates are few in number. According to one embodiment, the predicates are generated based on a particular table order. The order may be, for example, the order in which the tables appear in the row source tree of the query. However, basing the order on the row source tree of the query is only one example of how the table order may be determined.

For the purpose of explanation, it shall be assumed that that the row source tree of query Q2 establishes the order table order of: Customer, Orders, Order_Lines. Based on this table order, the database would first generate the following filter condition for the Customer table:
Customer:
(Customer.name='Joe' and (CHG_COL(name) or CHG_COL(customer_id))

The database server would generate the following filter conditions for the Orders table:
ORDERS: (this can involve instantiated Join predicates)
(ORDERS.order_date>'Jan-2007' and ORDERS.customer_id=10) and
(CHG_COL(order_date) OR CHG_COL(order_id)

Note that the filter conditions on ORDERS includes two subclauses: (1) ORDERS.order_date>'Jan-2007', which is referred to as exclusive clause since it is derived from ORDERS stand-alone, and (2) ORDERS.customer_id=10, which is referred to as a JOIN clause, since it is derived as a result of instantiating the JOIN).

Instantiating a JOIN involves forming a join clause based on the actual values that satisfied that join predicate of the query in the previous execution of the query. In this example, during the initial execution of query Q2, the predicate "C.customer_id=O.customer_id" was only satisfied by the value 10. Therefore, the instantiation of the join results in the join clause "ORDERS.customer_id=10".

Finally, the database server would generated the following filter condition for the Order_Lines table:
Order_Lines:
ORDER_LINES.order_id=55 OR ORDER_LINES.order_id=56 OR
ORDER_LINES.order_id=57 AND (CHG_COL(item_qty) or CHG_COL(item_name) of CHG_COL(order_id))

In this example, the Filter Condition on ORDER_LINES is derived by instantiating the JOIN predicates. In this case, the predicate O.order_id=OL.order_id was satisfied by three values (55, 56, 57) during the initial execution of query Q2. Thus, the resulting JOIN clause of the filter condition is ORDER_LINES.order_id=55 OR ORDER_LINES.order_id=56 OR ORDER_LINES.order_id=57.

The change column clause of the ORDER_LINES filter expression is CHG_COL(item_qty) or CHG_COL(item_name) of CHG_COL(order_id). The item_qty and item_name change columns appear in the SELECT clause of query Q2, while the order_id change column appears in a predicate of query Q2.

According to one embodiment, when instantiating predicates, join clauses are derived from VIRTUAL JOIN CLAUSES and JOIN source queries. For example, in query Q2, the JOIN SOURCE QUERY on ORDERS is SELECT customer_id from CUSTOMERS where name='Joe' The VIRTUAL JOIN CLAUSE on ORDERS is ORDERS.customer_id=CUSTOMERS.customer_id. The ACTUAL JOIN CLAUSE on ORDERS is derived by substituting Tuple-values from the JOIN SOURCE QUERY into the VIRTUAL JOIN CLAUSE for the CUSTOMERS.customer_id column. If there are multiple rows returned by the join source query, then the database server creates a disjunction.

In query Q2, the JOIN SOURCE QUERY on ORDER_LINES is SELECT ORDERS.order_id from ORDERS, CUSTOMERS where ORDERS.customer_id=customer.customer_id and customers.name='Joe' and ORDERS.order_date>'Jan. 1, 2007'.

The result of JOIN source queries can change due to DML transactions. Therefore the instantiated JOIN clause of queries that depend on this JOIN source query will also need to be kept updated.

As shall be described in greater detail hereafter, during the Transaction Evaluation phase, the filter condition generated for each table is compared with the before and after images produced by changes to rows in the table. If the filter condition is not satisfied by either the before or the after image of the change, then the change does not affect the results of the registered query. For example, when a row within the Customer table is changed, the filter (Customer.name='Joe' and (CHG_COL(name) or CHG_COL(customer_id)) is applied to both the before and after image of the change to determine whether the change affects the results of continuous query Q2. If neither the before nor after image satisfy the filter, then the change does not affect the result set of Q2. On the other hand, if either the before or after image of the changed row satisfies the filter, then it is likely that the change does affect the result set of the query Q2.

Filter Condition Specificity

According to one embodiment, the filter condition for a table/query combination is used to determine whether the results of the query are likely to have been affected by a change to the table. Since a filter condition is only used to determine whether the query results are likely to have been affected, and not whether the query results are actually affected, the conditions need not be as specific as possible. Specifically, "false positives" produced during the DML evaluation phase do not negate the correctness of the ultimate results because false positives are pruned during the commit-phase processing, to produce a subset includes only the queries whose result sets have actually changed.

In the examples given above, some of the filter conditions are quite specific. For example, for query Q2 the filter condition for the ORDERS table is (ORDERS.order_date>'Jan-2007' and ORDERS.customer_id=10) and (CHG_COL(order_date) OR CHG_COL(order_id).

However, for correctness, it is not necessary for the filter conditions to be as specific as possible. Rather, as long as a filter condition for a table/query combination is guaranteed to be true for all changes that actually affect the result of the query, the filter condition may be used. For example, for Q2 the filter condition for the ORDERS table could simply be (ORDERS.order_date>'Jan-2007'). This filter condition would result in a greater number of "false positives" (the condition would evaluate to TRUE for many changes to do not actually affect the result set of query Q2), but the filter expression would still capture all of the true positives, and therefore yield correct results.

Filter Index

Multiple continuous queries (possibly on multiple tables) may be registered with a database system. To efficiently handle the evaluation of filter conditions of multiple continuous queries, in one embodiment, a reverse mapping (Filter Condition→query) is created for each of the registered queries. The database server then creates a FILTER-INDEX on all the filter conditions captured for the registered queries.

According to one embodiment, the FILTER-INDEX is designed in such a way that, given a row before image and after image and a DML, the index lookup will be efficiently able to determine the SET of CANDIDATE queries that are likely to have changed their query result as a result of the current DML. Specifically, the FILTER-INDEX compares the before image and the after image of a change to a table to the filter conditions that have been created for that table. If a filter condition for a table is satisfied by either the before image or the after image of the change, then the FILTER-INDEX returns the queryIDs of the registered queries that are associated with the filter condition.

Various implementations of the FILTER INDEX are described in U.S. patent application Ser. No. 12/326,882, the contents of which are incorporated herein by this reference. For the purposes of explanation, it shall be assumed that the filter index has the following properties:

(1) The FILTER INDEX is persisted onto disk. This includes all meta data pertaining to the query including the queryId, queryText (bind variables etc).

(2) In memory data structures are created BASED OFF the disk filter index to permit efficient filter lookup without accessing disk structures. It must be noted however, that the in memory data structures are a CACHE of the disk versions, and the operations that involve the filter index must continue to work across instance restarts/shutdowns/memory deletion. In each of these cases (instance shutdown, memory deletion etc), The in memory index may be rebuilt by reading the appropriate dictionary meta data.

(3) OBJECT-SPECIFIC-FILTER-CACHES: A typical organization of the filter index, which is assumed here, is to CLUSTER THE FILTER CONDITIONS BY OBJECT ID (OR table_id or table_name) i.e the filter caches for different objects are logically different data structures AND all filter conditions for the same object across multiple queries are clustered with each other.

Thus, the mapping information may establish the following relationships: OBJECT (corresponds to a user table)→FILTER CONDITIONS involving this OBJECT (across all registered queries)→QUERIES that satisfy the filter conditions. For example, in a real scenario, the mapping information might look like:

CUSTOMER→CUSTOMER.customer_id=10→
$Q1,Q2$

CUSTOMER→CUSTOMER.customer_id=100→
$Q2,Q3$.

The reason for organizing the filter index as described above is for ease and efficiency of evaluation. An OLTP transaction operates on user tables and changes the state of one or more rows: given this, the database server needs to be able to determine the candidate set of queries that need to be evaluated. The database server first checks if the Modified object is an interesting object i.e the object appears in a registered query. If this check succeeds, the database server determines what Filter Conditions are satisfied by the given DML (could be a multi row modification) by looking up the filter index. Once the database server knows which filter conditions are satisfied, the database server uses the inverse map, as shown above, to identify the set of queries that need evaluation.

Using Filter Conditions to Select Candidate Queries

The relationship captured by the filter conditions and the filter index is sufficient to determine a FIRST SET OF CANDIDATE queries which are likely to be affected by a given transaction. To determine with full certainty if the query result changed with transactional semantics, the database server needs to consider additional scenarios, such as compensating DMLs (insert of a row followed by deletion of the same row: individually the DMLs appear to change the result but at the end of the transaction there is no result change because of the compensation).

Also, if the query involves JOINS (e.g. between A and B), DMLs to both A and B may be performed within a single transaction which nullify each other's effects. For example a transaction might insert a row into A which JOINS with an existing row in B, but delete the JOINING-row from B in a subsequent DML.

According to one embodiment, an EVALUATION process within the database server is used, after the set of candidate queries is established, to determine from the set of candidate queries which of the candidate queries have a result set that has actually changed.

Registration Time SCN/Serialization Protocol

To providing transactional consistency of notifications, the database server employs a protocol that ensures that a notification is produced in response to every transaction that (a) commits at an SCN higher than the SNAPSHOT SCN of the first result set and (b) causes the query result to change. Ensuring this outcome is complicated by the fact that registrations maybe created and deleted dynamically, so the database server needs to ensure proper serialization between registrations and transactions without introducing undue processing to the OLTP transactions in the absence of registrations in the database.

Further, in a clustered database embodiment, the protocol has to work across multiple instances of a Clustered Database (SHARED_DISK also referred to as RAC) where OLTP transactions may land on instances other than the instance on which the registration is being created.

Figure 1:
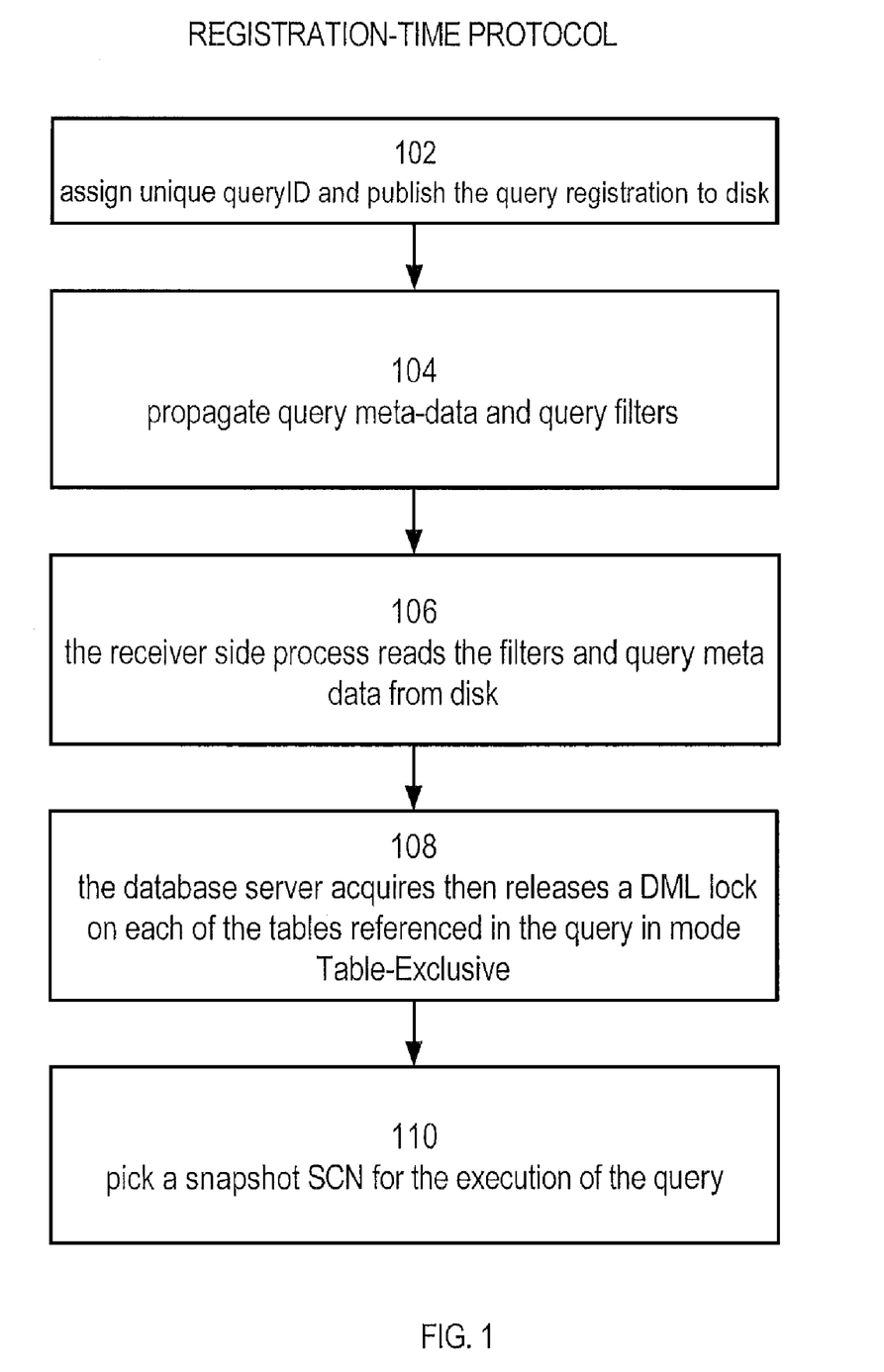
FIG. 1 is a flowchart illustrating steps for registering a query, according to an embodiment of the invention.

Referring to FIG. 1, according to one embodiment, the database server first assigns the query a unique queryId, and publishes the query registration to disk (step 102) within a recursive transaction. This information includes the query meta data, such as the queryId and querytext, as well as the filter conditions (persistent part of the filter index). The queryId serves as a primary key for the meta-data associated with the query. Given a queryId, it should be possible to read the relevant meta data and filter conditions using standard SQL and the queryId as key.

After the database server publishes the query registration to disk, the database server then propagates the query meta-data and query filters to all of the remote instances' shared memory (step 104) and to local Shared Memory using the queryId as the key. According to one embodiment, the propagation operation uses Remote Procedure Calls using the Cluster Interconnect as the messaging infrastructure. When the receiver side of the RPC executes on the remote instance, the receiver side process reads the filters and query meta data from disk (step 106) and updates its memory cache. At this point, the query is "visible" to the receiving instance.

After the query is visible at each instance, from the registration path, the database server acquires the DML lock (also referred to as Table Lock) on each of the tables referenced in the query in mode Table-Exclusive (step 108). Once the lock is obtained, the lock is released. This process of locking and releasing is done serially on all tables involved in the query. This step causes the registration to wait for all concurrent transactions that "did not see the query but perhaps committed at an SCN higher than the query SCN) (Table locks or DML locks are acquired by databases to block conflicting DDLs. Usually such locks are acquired in Row Exclusive modes for DML operations).

In situations where the implementation of the Database does not support Table Locks, the database server performs the database specific step of waiting for "all active transactions to commit that have started with a start time stamp>the beginning of the registration and that have also modified the objects referenced in the query".

After the locks have been acquired and released for all tables referenced in the query, the database server picks a snapshot SCN for the execution of the query (step 110)—this ensures that the snapshot time of the query excludes all the transactions that have missed out on seeing this query.

After picking the snapshot SCN for the query, the query registration is now valid and the state is updated to reflect the fact that it is valid in the dictionary as well as in memory and on remote instances.

The above protocol guarantees that all transactions that commit at an SCN higher than the query snapshot SCN "evaluate the query" for the purposes of determining the status of query result change with respect to this transaction (This protocol also guarantees that overhead to DML transactions at is minimized. This is particularly important if the transaction only modifies uninteresting objects (i.e. those objects which are not part of any registered query). If none of the objects changed by the transaction are interesting, then it can safely commit without any further processing for query evaluations. Even if a concurrent query-registration were being added which refers to one of the objects changed by the txn, it is guaranteed to wait for the DML txn and thus include the effects of the transaction in its query snapshot.

Transactional Evaluation Flow

Once query registrations have been performed and the database has the necessary dictionary and memory state captured for the registered queries, the database server must figure out which queries have result sets that have changed as a result of a given transaction's changes.

According to one embodiment, the work determining which registered queries have result sets that are changed by a transaction is subdivided into two phases: (a) DML time filtering—determining a candidate set of queries, and (b) COMMIT time evaluation (also elimination of false positives). The commit time evaluation can be either pre commit or post commit. The commit time evaluation can also be performed across batches or sequences of multiple transactions.

DML Time Filtering

The DML Time Filtering involves determining the candidate set of queries that can be considered for future evaluation. The entity responsible for performing the DML time filtering is referred to herein as the DML Time Filtering module. According to one embodiment, the inputs to the DML time filtering module are (a) Row Before Images of modified rows (b) Row After Images of modified rows (c) ColIds of the changed columns The output of the DML Time Filtering module is the set of queryIds of registered queries that are potentially affected by the current DML. The filter index lookup of the modified Table is performed to determine the queries affected. As noted before, each user table which is part of a registered query has its own filter index.

A given DML can change multiple rows, in which case the above information is needed for all the modified rows in question. The DML Time Filtering module uses the row images to determine the set of filter conditions satisfied by the row before image and the row after image. This is done by looking up the filter Index, as mentioned above.

Once the filter conditions are satisfied, the database server also figures out the queries that correspond to these filter conditions (reverse lookup). The queryIds of these queries are saved to an in memory structure/transaction control object which can be accessed later (such as COMMIT TIME). If the number of queryIds is too large, the database server can adopt some roll-up schemes (indicate all queries for the given object).

The filter Index is an evolving Data Structure whose state can change as a result of transaction commits (due to Instantiated Join Predicates). Consequently, associated with the filter index is the version number which is advanced on every state change (the version number can be implemented using the System Commit Number).

The reason for the filter Index evolution is the Join Caching. Because of the join caching, the Filter Index lookup performed at DML time may go stale by the time the transaction commits. According to one embodiment, the database server remembers the version number of the Filter Index at the Time the database server accessed the Filter Index by creating a data structure keyed by the user Table Number within the transaction control object. The version number can be compared against the version number of the Filter Index at commit time, to detect if any stale Reads occurred. This is necessary if the Filter Index employs the use of Join Caching (instantiated Join Predicates) thereby necessitating maintenance due to changes to the result set of JOIN SOURCE QUERIES.

According to one embodiment, the DML time filtering is performed "before the change pertaining to the DML is applied to the database blocks." DML Time Filtering is useful because it is efficient: access to the change records is readily available in memory (especially the POST IMAGES of the changed columns). Access to the prior state of the rows (row before images) is available in the Buffer Cache Blocks which are pinned in Memory—As a result, obtaining Row Before And After Images at this time is likely to be very efficient. Moreover, determining the candidate set of queries greatly reduces the set of queries that need to be considered for evaluation. In several applications, where the predicates inside the queries are highly selective, the set of queries determined in this phase maybe of low cardinality or even the EMPTY SET thereby eliminating requirement for any future processing.

In cases where the application is willing to live with FALSE POSITIVES, the set of queryIds determined by the efficient DML time filtering may immediately be notified without further processing. This is particularly useful when we have single table queries and we are willing to disregard false positives due to compensating effects of multiple DMLs.

Since DML time filtering is performed before persisting the log records to disk, when a DML is found to be interesting i.e capable of causing result changes to one or more registered queries, we can annotate the LOG RECORD saying that the DML is interesting. This indicates to downstream processing that this LOG RECORD corresponds to the modification of an interesting row and thus needs to be processed. Absence of the "interesting-bit" indicates that the log record is uninteresting. This annotation can greatly increase the efficiency of downstream processing by reducing the total number of log records that will actually need to be processed.

Figure 4:
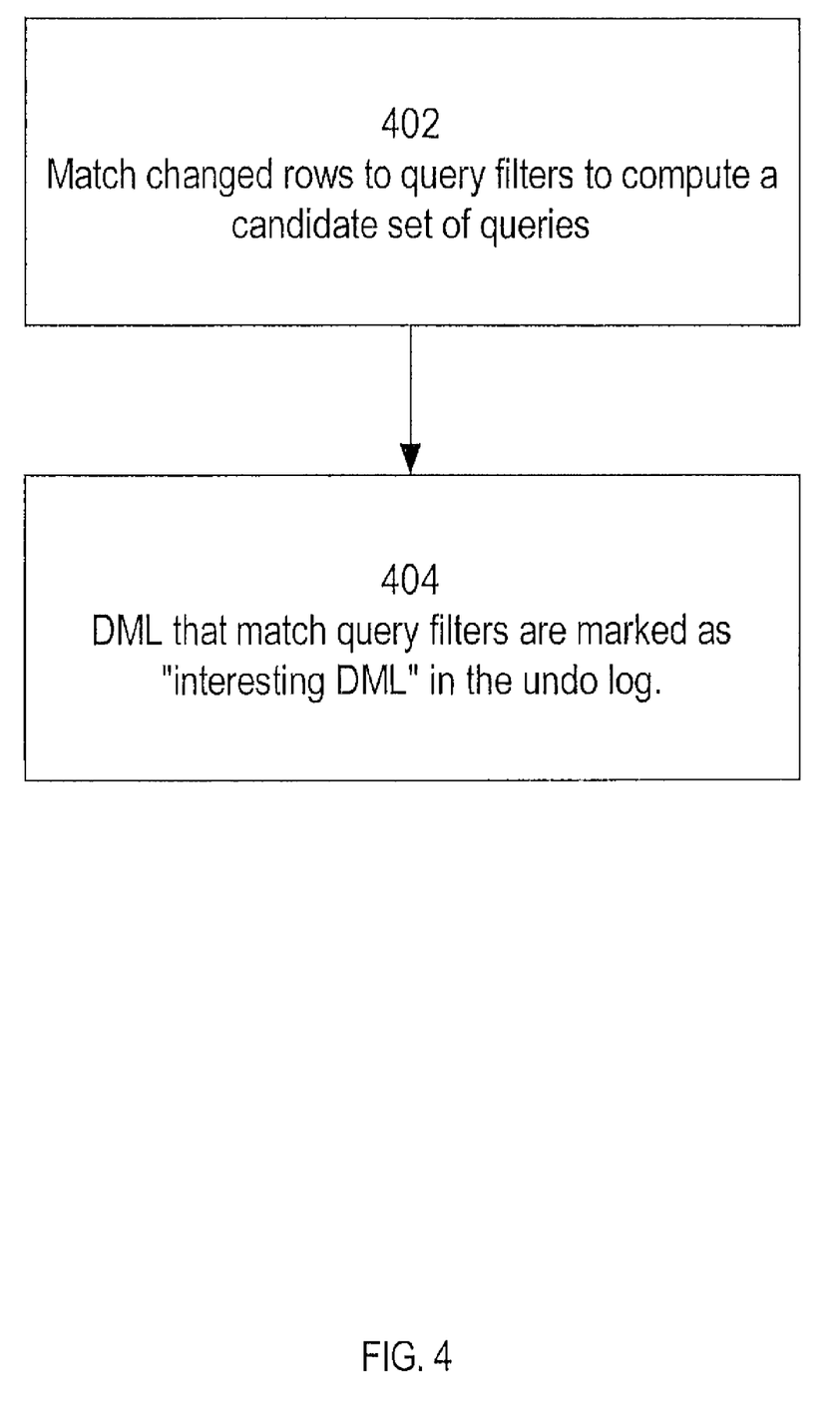
FIG. 4 is a flowchart illustrating steps for DML-time processing, according to an embodiment of the invention.

FIG. 4 is a flowchart that summarizes the steps involved in DML-time processing, according to an embodiment of the invention. Referring to FIG. 4, in step 402 changed rows are matched to query filters to compute a candidate set of queries. In step 404, a DML that matches query filters (and produces a candidate query) is marked as an "interesting DML" in the undo log.

Commit Time Processing

The COMMIT TIME processing involves the final phase work involving in pruning FALSE POSITIVES and determining from the set of CANDIDATE QUERIES the ones that actually changed.

Pre-Commit Processing

According to one embodiment, during the precommit phase, the database server performs two tasks: (1) Special Log Marker: the special log marker is needed if this phase of the evaluation needs to communicate the candidate set of queries needing evaluation to downstream processing, this marker can communicate necessary information to the evaluation module: importantly the Set of Candidate Queries that are affected. (2) In Memory Lock acquisition to serialize access to the table level filter data structures. This step is only necessary when the Filter Index contains Predicates (Filter Conditions) derived from instantiation of Joins. Because of Join Instantiation, the filter caches themselves may be updated by the current or concurrent transactions.

According to one embodiment, a Global In Memory Lock (keyed by the Table Number) is used to address this issue. The lock itself is global (visible across multiple instances and lock consistency guaranteed by cluster interconnect messaging). One lock is used per Table which appears as part of a registered query.

For the purpose of explanation, it is assumed that there are two lock modes for the In memory Locks Keyed by the Table Number. READ and UPDATE. READ is compatible with READ but not with UPDATE, while UPDATE is compatible with UPDATE but not with READ.

A transaction that reads the filter conditions for a table acquires the lock in READ mode. Any transaction that modifies the table is a reader of the filter conditions for that table.

A transaction that potentially (pending further evaluation) can UPDATE the filter conditions for a table acquires the lock in UPDATE MODE. Since the database server does not know for sure whether the query result changed prior to the full evaluation, the database server pessimistically assumes that all queries from the candidate short list that have JOIN CACHING may have one or more filter caches updated. For example, in the example query Q2 shown above, a DML to ORDERS which satisfies the ORDERS.customer_id=10 and ORDERS.order_id>'Jan-1-2007' will acquire the lock on ORDER_LINES (recipient of JOIN predicate) in UPDATE MODE.

In an alternative embodiment, the lock granularity can be QUERY.TABLE instead of just TABLE. While this can maximize concurrency (reads and writes to JOIN CACHES of multiple queries do not block each other), this can lead to more locks being acquired depending on the size of the candidate query list.

According to one embodiment, the In memory Locks described in this section are held ACROSS THE COMMIT of the transaction.

Handling Filter Cache Stale Reads

A reader of the filter cache for an object has to recheck whether the version of the filter Cache that was read at DML time is the same as the current version while holding the In memory Lock in READ mode. If the current version is higher, it means that the state of the filter cache may have changed as a result of concurrent transactions (subsequent to the DML) and so, the earlier read and query-set computation maybe stale. The reader now has two choices (a) Recompute the set of the Queries by looking at all (UNDO) LOG records based off the newer version of the Filter Cache. Since it holds the lock in READ mode, it can rest assured that the state is not going to change further until it commits. (b) Pessimistically evaluate all queries that reference this object in downstream processing.

Query Evaluation to Compute Final Set of Changed Queries

According to one embodiment, during a QUERY EVALUATION phase, the database server determines which among the candidate set of queries has changed in a FALSE POSITIVE proof fashion. During the query evaluation phase, the database server also computes QUERY-DELTAS for Join-Source-Queries, and updates the JOIN-CLAUSE commit filters(s) if necessary.

Figure 2:
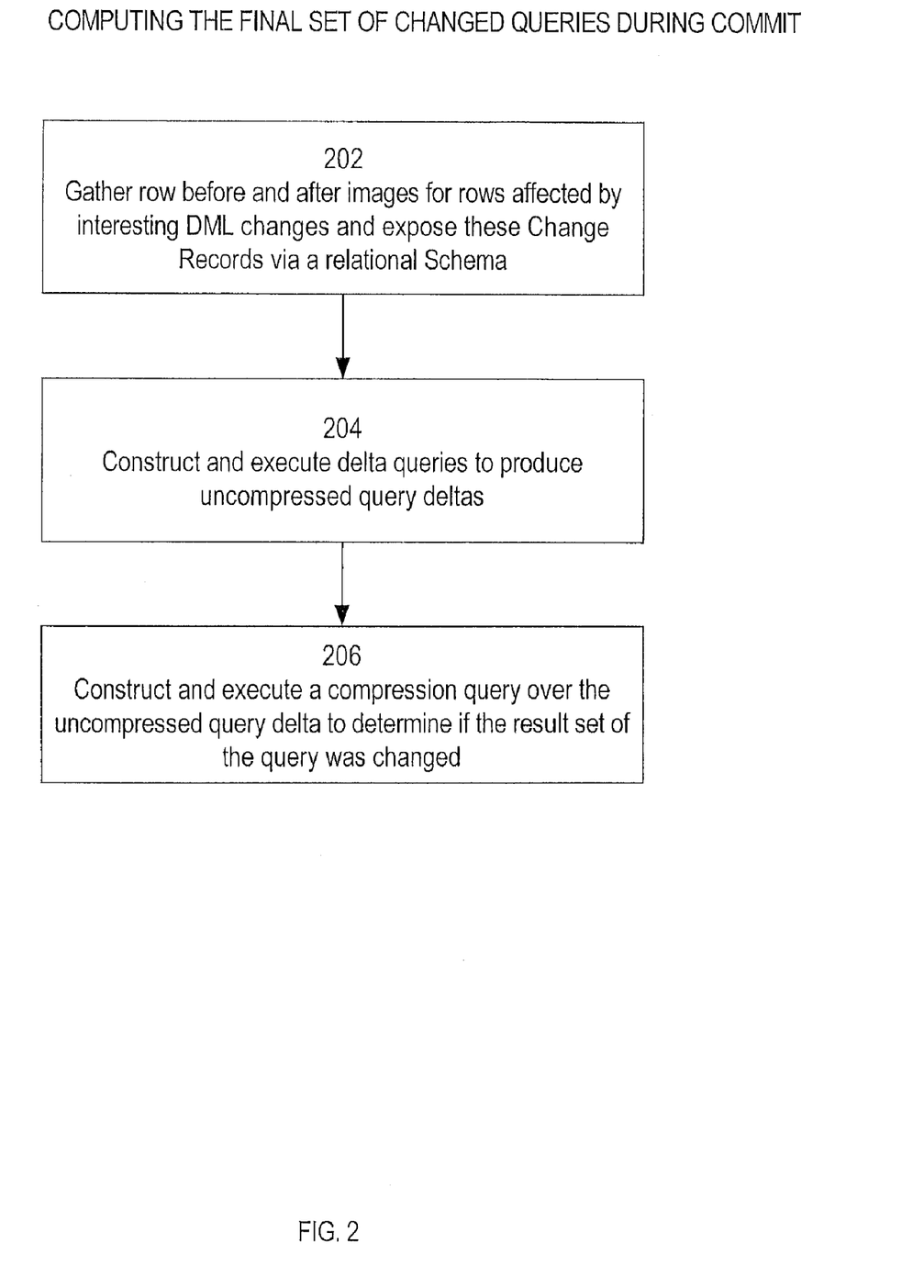
FIG. 2 is a flowchart illustrating steps for determining whether the result set of a query has changed, according to an embodiment of the invention.

In one embodiment, the query evaluation to compute final notifications for candidate queries includes the steps illustrated in FIG. 2. According to one embodiment, the steps illustrated in FIG. 2 are performed during the commit phase of the DML transaction that made the updates to the rows. Referring to FIG. 2, it illustrates the following steps:

Step 202: Gathering row before and after images for rowids affected by interesting DML changes and exposing these Change Records via a relational Schema (that can be queried using Standard SQL)

Step 204: Constructing and executing DELTA_QUERIES (CANDIDATE_QUERY(Q), CHANGED_TABLE(T)) which generates uncompressed query Deltas for a candidate Query Q. The uncompressed query delta is generated in a temporary Table whose schema mimics the schema of the query.

Step 206: For each table T changed by the transaction, constructing and executing a compression query over the uncompressed query delta of Q to determine if the query result set changed. The output of this phase also produces the QUERY-DELTA (change to the query result) generated as a result of the transaction.

Final Phase Query Evaluation

The database server has a choice of performing final phase query Evaluation either pre-commit or post-commit. Each of these options shall be described hereafter. It should be noted that the following description assumes that a database server is able to process Snapshot Consistent Queries (Statement level read consistency/CR), as well as process queries with Tables annotated with Explicit Snapshot Times/SCNs), also known as Flashback Queries. However, in alternative embodiment, alternative techniques may be used to perform final phase query evaluation using database servers that to not support this functionality.

(a) Performing final phase query evaluation prior to the commit of the transaction that made the changes minimizes the latency between transaction commit and notification, since all decisions are made before the transaction commits. Performing pre-commit final phase query evaluation also enables the notification to be generated atomically with the transaction. However, performing pre-commit final phase query evaluation can cause an increase in the latency of the transaction, particularly if the transaction is large and there are a large number of queries to be processed.

Further, when the database server is doing precommit processing, the database server serializes accesses to tables which are involved in a JOIN relation ship. For example, if a transaction TX1 modifies Table A, and transaction Tx2 modifies Table B, and tables A and B are involved in a JOIN in a registered Query, then while TX1 is performing its query evaluation over the changes done to A, TX1 needs to ensure that Table B state does not change by a transaction whose commit SCN is lower than the eventual commit SCN of TX1.

For this TX1 needs to acquire an In memory Table Lock on B in UPDATE mode. Doing so, will serialize with TX2 because TX2 acquires the In Memory Table Lock on B in READ mode. (Note that if the query in question already has Join caching enabled, the database server would acquire the locks in the appropriate modes for the consistency of the Join Cache, and hence this requirement is automatically taken care of).

Another advantage of pre commit processing is that precommit processing allows Clauses Derived From Join Caching to be Maintained atomically with the transaction, thereby ensuring their consistency.

(b) Performing final phase query evaluation after to the commit of the transaction that made the changes can enable greater throughput by offloading the query evaluation to other processes (such as background processes) while releasing the OLTP process to do other application-related work. However, for this to work, the database server needs to ensure that log records of the transaction are preserved until such time as those log records have been consumed and the necessary Query Evaluation has been performed. Retaining logs in this manner can burden the log management resources due to the higher retention requirements imposed on these resources.

Another advantage of post commit processing is that, since the transaction that made the changes is now committed, one is able to obtain a view of the database at the precise time of transaction commit without worrying about state changes on dependent Tables. Thus, locking required purely for the purposes of Query Evaluation is eliminated.

If one or more registered queries also employs the use of cached JOIN predicates, then post commit processing has an additional constraint. Specifically, the database server needs to ensure that the transactions are processed in SCN order if they have updates to the Set of Filter Conditions for the same Object. This ensures the consistency of the FILTER CONDITIONS (and the filter index).

When post-commit evaluation is used, the database server preserves log records across commit. This can be done by annotating the log record header (transaction table slot for this transaction) with a special bit. The bit prevents the log records for this transaction to be consumed. The bit can be cleared once all query processing for the transaction has been completed. If post-commit processing is chosen for a transaction, that commits at SCNs, then JOIN caching has to be turned-off for ALL queries potentially affected by the transaction until such time as query-evaluation for all transactions that committed at SCNs less than or equal to S has completed. During this time, DMLS may determine the candidate set of queries ONLY USING the exclusive part of the query clause (and must not consult the JOIN clause portion as a necessary condition to be satisfied). This is because the state of the JOIN clause is unknown until such time as the evaluation of the pending transaction completes.

Gathering Change Records and Exposing Change Records through a Relational Schema According to one embodiment, a walk is performed on the undo log records of a transaction to obtain the row before and after images of the changed rows of the transaction. Typically, the UNDO RECORD only gives the rowid and the before Image. The after Image is obtained by pinning the "data block" and obtaining the version of the row as of the commit time of the transaction. If the transaction is still not committed, the database server gets the version of the row as of the current time (if uncommitted, the row lock held by the transaction on the row prevents the row from changing). The before and after images of rows modified within the transaction are referred to hereafter as the "change records" of the transaction.

Note that since undo records have already been annotated as either interesting or uninteresting during the DML time filtering phase, the database server can maximize performance by gathering only those change records that pertain to rows which were part of an "interesting undo record" obtained from the LOG.

In one variant, the database server maximizes locality by visiting a data block once, for all rowids present in a data block which were also modified by the transaction. The database server can obtain the change records for all these rows in one visit to the data block.

According to one embodiment, the log records have a logical schema (ROWID, ROW_BEF_IMAGE (COL0, COL1 . . . ), ROW_AFT_IMAGE(COL0, COL1, . . . ), TABLENO, DML_TYPE).

In one variant, the Change Records are buffered in a temporary table with a schema mimicking the above. This is useful if there are a large number of "interesting change records" to process (for example for very large sized Transactions). The other benefit of using a temporary table is that it gives straightforward relational access (SQL based) to the contents of the changed records that can be subsequently used for driving query evaluation. The DML type can be one of INSERT (+1) or DELETE (−1). An UPDATE can be modeled as a DELETE followed by an INSERT.

In an alternative scheme, the change records can be buffered purely in memory (as much as memory permits) and super-impose a relational view on top of this in memory data structure much like the "FIXED-VIEWS" or "FIXED-TABLES" of commercial databases, in order to enable relational access to in memory data structures. If the in memory buffer fills up, the database server drives query evaluation for the set of change records buffered currently, and then continues. This implies a staged evaluation/batched evaluation. For large transactions, the database server may drive multiple batches of evaluation.

In either case, the database server exposes the change records via a relational schema: For the purpose of explanation, the relational schema used to expose change records shall be referred to by the Relational Table Name: CHANGE_RECORD_LOG(object_num), where object_num is the object number of the table whose change records are being referring to. In general, the change record log for a table will have two entries for each row modified in that table (−1, col0, col1 . . . )—corresponds to the row before Image (+1, col0, col1 . . . )—corresponds to the row after Image.

According to one embodiment, the first virtual column is a SIGN column which is −1 for the before Image and +1 for the after image. (For inserts, there is only one entry for the after image and for deletes there is only one entry for the before image).

In the case of multiple operations to the same row, the database server computes an effective operation: and only one before Image and one after Image. The before Image is the version of the row before the transaction began and the after Image is the version of the row as of the time the transaction committed.

Note that the database server also has the choice of having a TABLE-SPECIFIC SCHEMA or a TABLE-NEUTRAL-SCHEMA. A Table-Aware schema will correspond exactly to the columns from the table (same column names) while a table neutral schema will attempt to map columns from the table to a generic schema with table neutral names such as COL0_0, COL0_1 etc. In the latter case, the schema has to be wide enough to accommodate columns from all tables that appear in registered queries. A typical scheme to have a table neutral schema would be to map a column from the user Table to the generic column COl_idx1_idx2 columns where idx1 is an ordinal assigned to the Type of the column (NUMBER, CHAR, VARCHAR2 etc) and idx2 is an ordinal reflecting the number of columns of that type that occur in that Table.

Constructing and Executing Delta Queries Using the Change_Record_Log

For the purpose of explanation, consider again query Q2:
select ol.item_qty, ol.item_name
from orders O, order_lines OL, customers C
where C.name='Joe' and C.customer_id=O.customer_id and O.order_date>'Jan-2007' and
O.order_id=OL.order_id Assume that a user inserts a New Order Line Item Row for Order Id 55 (which is already part of the result set) with:
INSERT into order_lines (order_id=55, item_name='IPHONE', item_qty=4).

Also, assume that the user realizes that the user had previously incorrectly entered the customer id for orderid 55 as 10 instead of 100, and the user needed to correct it (note that 10 is for customer 'Joe' while 100 is for some other customer). Consequently, as part of the same transaction, the user may submit:
UPDATE ORDERS set customer_id=100 where order_id=55;

As a result both ORDER_LINES and ORDERS tables are modified within the same transaction.

At DML evaluation time, the database server finds that both the DMLs satisfy the respective filter conditions derived on Order (ORDERS.order_id=55 AND ORDERS.customer_id=10 on before Image) and (Order_lines.order_id=55), so both the log records are marked "interesting".

During the Final Phase Query Evaluation, the database server executes two Delta-Queries for this query Q, one for the changes to ORDERS and the other for the change to ORDER_LINES.

Ensuring Consistent Evaluation Across Changes to Multiple Tables

The database server needs to ensure that each change is JOINED against the correct version of the other Table in order to avoid false duplicate tuples. False duplicate tuples will be generated in the above example if the changes to ORDERS and ORDER_LINES within this transaction are joined with each other twice (instead of once), once during the evaluation of ORDER's changes and again during the evaluation of ORDER_LINE's changes. Note that ORDERS originally contained the row (customer_id=10, order_id=55, order_date'1-Feb-2007), which is updated as a result of the DML statement in [0126].

For this, the database server imposes an ordering of changes across the tables referenced in the query. This ordering can be determined arbitrarily based on left→right sequencing of tables in the query or any other criteria. However, it is important that the same ordering is used across all transactions that perform query evaluation on this query.

For example, assume that the ordering chosen is ORDER_LINES<ORDERS<CUSTOMERS. Based on this ordering, the evaluation will treat all changes on ORDER_LINES as having occurred before all changes on ORDERS which in turn are treated as having occurred before all changes on CUSTOMERS (in this transaction there are none). This ordering determines what snapshots should be used for the tables involved in the Query.

The following shows the Delta Queries for Q for order_lines and Orders respectively. Each Delta Tuple from the Delta Query has an additional virtual Column which can take two values (+1, or −1) depending on whether the tuple is being INSERTED or DELETED from the previous query result. This virtual column is inherited from the change record log: a row after image is considered to be inserted (+1) while a row before image is considered to have been effectively deleted (−1)

DeltA_query(Q, ORDER_LINES): SELECT CHANGE_RECORD_LOG(ORDER_LINES). SIGN, CHANGE_RECORD_LOG(ORDER_LINES).item_qty, CHANGE_RECORD_LOG(ORDER_LINES).item_name
   from Orders AS OF
(COMMIT_TIME-1) O, CHANGE_RECORD_LOG(ORDER_LINES) CLOG, customers
AS OF COMMIT_TIME-1 C where C.name='Joe' and C.customer_id=O.customer_id and
O.order_id=CLOG.order_id and O.order_date>'jan-2007'

Note that the snapshot chosen for CUSTOMERS and ORDERS is (COMMIT_TIME-1) reflecting the fact that the DMLs are ordered in such a way that when the change to ORDER_LINES occurred, no changes as yet had been applied to either CUSTOMERS or ORDERS.

Note that since a tuple was inserted (only after image but no before image for this row), the end result of the execution of this query is to generate the tuple (+1, 'IPHONE', 4) into the query delta for Q referred to hence forth as QUERY_DELTA (Q)

Delta_query(Q, ORDERS) SELECT CHANGE_RECORD_LOG(ORDERS).SIGN, ORDER_LINES.item_qty, ORDER_LINES.item_name from CHANGE_RECORD_LOG(ORDERS) CLOG, ORDER_LINES AS OF (COMMIT_TIME), CHANGE_RECORD_LOG(ORDERS), customers AS OF COMMIT_TIME-1 C where C.name='Joe' and C.customer_id=CLOG.customer_id and CLOG.order_id=ORDER_LINES.order_id and CLOG.order_date>'Jan-2007'

The snapshot chosen for CUSTOMERS is (COMMIT_TIME-1), reflecting the fact that the algorithm orders the DMLs in such a way that when the change to ORDERS occurred, no changes as yet had been applied to either CUSTOMERS. The snapshot chosen for ORDER_LINES is COMMIT_TIME, reflecting the fact that when the change to ORDERS was made, all changes to ORDER_LINES had already been applied.

Since the database server updated a row in ORDERS, the change record log on ORDERS has two rows (−1,customer_id=10, order_id=55, order_date='1-Feb-2007) corresponding to the row before image (+1, customer_id=100, order_id=55, order_date='1-Feb-2007) corresponding to the row after image.

The execution of the delta query above will produce a successful join only on the before image: This tuple not only joins with existing row (55, 'IPOD NANO', 4) but also joins with the newly inserted row within the current transaction producing two delta tuples (−1, 'IPOD NANO', 4) (−1, 'IPHONE', 4)

At the end of the execution of the two Delta Queries, the Query Delta consists of the following tuples (+1, 'IPHONE', 4) (−1, 'IPOD NANO, 4) (−1, 'IPHONE, 4)

This tuple not only joins with existing tuple in ORDER_LINES (55, 'IPOD NANO', 4) but also the newly inserted row into ORDER_LINES (55, 'IPHONE', 4).

(1) When constructing Delta_query(Q, T) where T appears in Q, all references to T in Q are substituted with CHANGE_RECORD_LOG(T)

(2) the database server imposes an ordering amongst the tables of Q such that each table U which appears in Q has an ordinal. If ORDINAL(A)<ORDINAL(B), then the database server treats A's changes as having been performed atomically and before all of B's changes have been performed.

Given this, if ORDINAL(U)<ORDINAL(T), where T is the changed table, the Snapshot chosen for U specified using AS OF is COMMIT_TIME (since U's changes have already been applied ~the database server wish to include changes performed on U within this transaction when executing the delta query) If ORDINAL(U)>ORDINAL(T) the snapshot chosen for U is COMMIT_TIME-1. This implies that the database server is excluding changes to U done within the current transaction because U will be modified later.

If the database server is doing the query evaluation at pre-commit time, as opposed to post-commit-time, then omitting a snapshot yields the same result as seeing all changes by the transaction (since default snapshot is guaranteed to include all uncommitted changes by current transaction). Specifying any recent Time as a snapshot hides the Transaction's changes.

The above example also illustrates that if multiple objects within a query have been modified as part of a transaction, then one delta query needs to be executed for each modified table. If the changes of the transaction are being processed in batches, then each batch will execute Delta Queries for that batch. The results of the Delta Queries have to be saved (either in Memory or in a temporary table on disk) until a final determination of query result has been made.

Constructing and Executing Delta Queries Using a Rowid Log

According to one embodiment, the database server has a log only of the ROWID (ROW IDENTIFIER) for the modified rows within the transaction, but not the before/after images. This can be the case when the transaction is very large (bulk loads).

If the database server knows the commit time of the transaction, the ROWID LOG can be used to derive the row images. For example:
SELECT*FROM ORDERS AS OF COMMIT_TIME where ORDERS.rowid in (SELECT ROWID from ROWID_LOG(ORDERS)) (This yields the row AFTER image as of the commit time of the transaction)
SELECT*FROM ORDERS AS OF (COMMIT_TIME-1) WHERE ORDERS.rowid in (SELECT ROWID FROM ROWID_LOG(ORDERS) (This yields the row BEFORE IMAGE i.e before the commit time of the transaction).

Having extracted the row before and after images, it should then be possible to compute uncompressed query deltas using the scheme described above.

Constructing and Executing Compression Queries Over the Query-Deltas to Generate Final Query Result Changes Given the uncompressed query delta for a query Q, the database server executes a compression query to compute the FINAL QUERY DELTA. If the FINAL_QUERY_DELTA is the empty set, then the query result of the registered query is NOT CHANGED. If the Final Query DELTA is non-empty, it then implies that the query result of the registered query did change.

In one embodiment, the uncompressed query delta is exposed as a relational schema with the column names mimicking the column_names that appear in the query select list. If the select list includes col_expressions, the database server can implicitly assign names for those select list items and use the same names in the compression query.

For uncompressed query result deltas of low cardinality, it is feasible to buffer the uncompressed delta entirely in memory and super impose a relational schema over this in memory data structure via a FIXED-TABLE or FIXED-VIEW. Alternately, if the uncompressed query delta is of a larger cardinality, it might be more efficient to have this query delta buffered in an ON_DISK temporary table.

In the case of the example query, the relational schema of the query delta DELTA_Q would be (sign, item_name, item_qty). Note that the "SIGN" is an implict column assigned by the algorithm corresponding to whether the tuple is being inserted or deleted from the query result. The COMPRESSION QUERY would look like:

SELECT item_name, item_qty from DELTA_Q GROUP BY (item_name, item_qty) HAVING (SUM(SIGN)<>0)

The following features can be generalized from the compression query described below.

(a) The database server includes all items from the SELECT LIST of the original query in the SELECT LIST of the compression Query.

(b) The database server has a GROUP BY on the columns included in the select list.

(c) The database server has the additional aggregation predicate HAVING (SUM(SIGN)>0). This additional aggregation predicate is used to ensure that compensating changes with the same column values are grouped together and their effect is compensated.

Applying the compression query on the delta tuples in the previous section, the tuples (+1, 'IPHONE', 4) and (−1, 'IPHONE, 4) will be grouped together and the SUM(SIGN) predicate will eliminate this tuple from the query delta. Therefore the FINAL QUERY DELTA computed in this scheme is: (−1, 'IPOD NANO', 4). This means that the tuple ('IPOD NANO', 4) is being deleted from the previous query result set due to the current transaction. The database server can therefore conclude that the query result is indeed changed.

To summarize, at the end of this phase, the database server generates a notification if the result of the compression Query is NOT NULL, and suppresses a notification if the result of the compression query is NULL.

The above technique also generates an accurate QUERY_DELTA for the query (what tuples are being added/deleted from the previous query result AND with what cardinality). Having the transactional query Delta is necessary to keep the JOIN-CLAUSES updated since, as seen earlier, JOIN-CLAUSES are derived directly from the result sets of JOIN-SOURCE_QUERIES.

Hardware Overview

Figure 3:
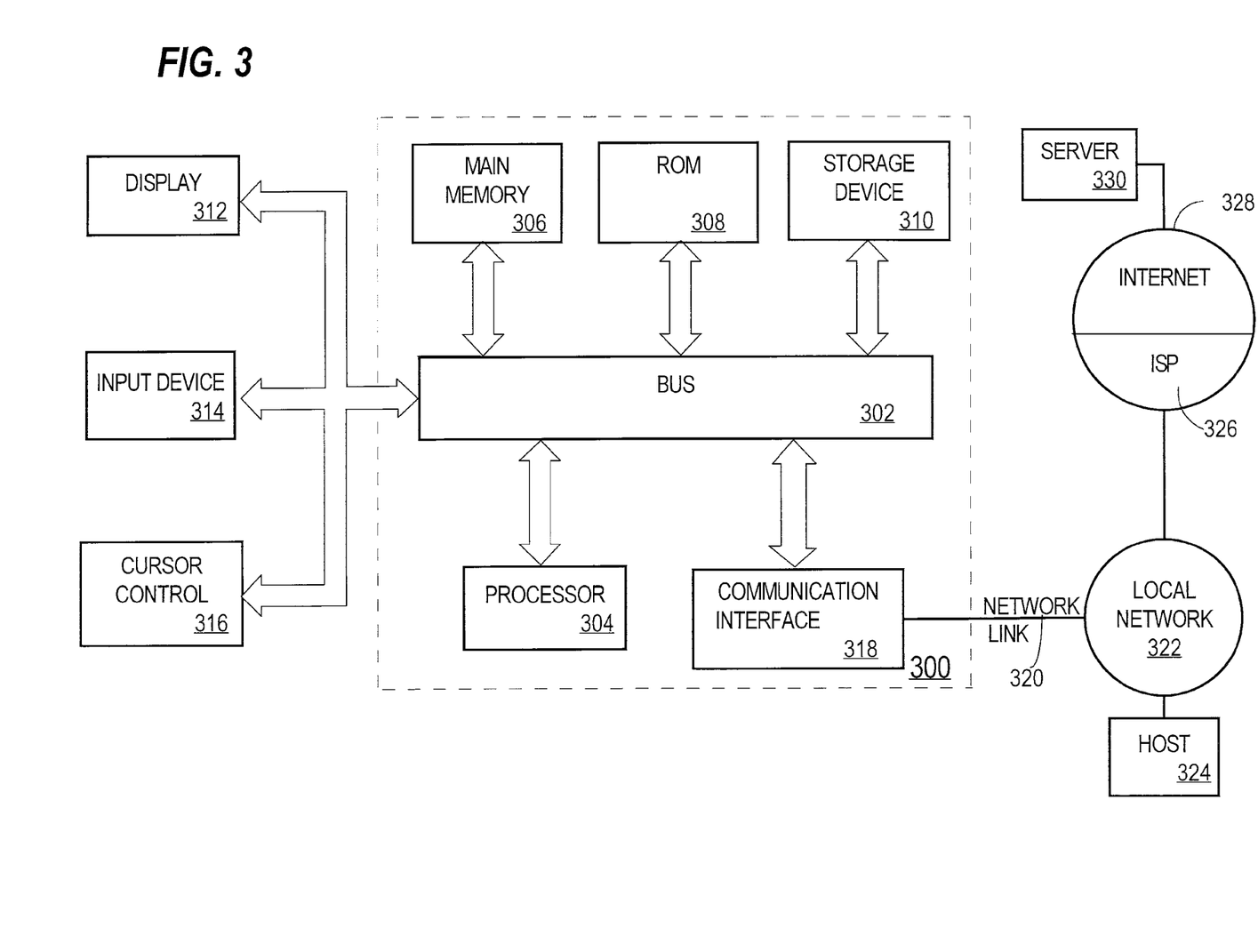
FIG. 3 is a block diagram upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for determining whether a change affects results produced by queries that belong to a set of registered queries, the method comprising:
   for a table referenced in a query from the set of registered queries, generating a filter condition based, at least in part, on a predicate of the query;
   determining whether the filter condition is satisfied by either (a) a before image of a row of the table, wherein the before image reflects the state of the row before the row was modified by a transaction, or (b) an after image of the row, wherein the after image of the row reflects the state of the row after the row was modified by the transaction;
   in response to determining that the filter condition is satisfied by either the before image or the after image, adding the query to a first set of queries, from the set of registered queries, whose result sets may have been affected by the transaction;
   wherein at least one query in the set of registered queries is not added to the first set of queries because a condition associated with the at least one query is not satisfied by either the before image or the after image;
   from among the first set of queries, determining a second set of queries that have result sets that were actually affected by the transaction;
   wherein one or more queries in the first set of queries are not in the second set of queries because the result sets of the one or more queries were not actually affected by the transaction; and
   sending notifications based on the second set of queries;
   wherein the method is performed by one or more computing devices.

2. The method of claim 1 wherein the step of determining a second set of queries includes, for each query in the first set of queries:
   generating a delta query based on the query, wherein the delta query replaces references to the table with references to a change record log; and
   executing the delta query to determine whether the result set of the query was affected by the transaction.

3. The method of claim 1 wherein:
   the table is a first table in a join clause of the query;
   the join clause joins the first table with a second table;
   the step of generating a filter condition include:
      determining values that satisfied the join clause during an execution of the query that occurred prior to the transaction; and
      generating the filter condition based on the values that satisfied the join clause during said execution.

4. The method of claim 3 wherein:
   the transaction affected which values satisfy the join clause; and
   the method further comprises the step of revising the filter condition to reflect which values current satisfy the join clause.

5. The method of claim 1 wherein:
the table is a first table in a join clause of the query;
the join clause joins the first table with a second table;
the transaction performed an operation on a second row in the second table;
the method further comprises the steps of:
  generating a second filter condition based, at least in part, on said predicate of the query;
  determining whether the filter condition is satisfied by either (a) a before image of the second row, or (b) an after image of the second row; and
  if the second filter condition is satisfied by either the before image of the second row or the after image of the second row, then adding the query to the first set of queries whose result sets may have been affected by the transaction.

6. The method of claim 5 wherein the step of determining a second set of queries includes:
  generating a first delta query based on the query, wherein, within the first delta query, references to the first table are replaced with references to a first change record log; and
  executing the first delta query to determine whether the result set of the query was affected by the transaction;
  generating a second delta query based on the query, wherein, within the second delta query, references to the second table are replaced with references to a second change record log; and
  executing the second delta query to determine whether the result set of the query was affected by the transaction.

7. The method of claim 6 wherein:
the first delta query includes a reference to the second table, and retrieves data from the second table as of a time before the transaction committed; and
the second delta query includes a reference to the first table, and retrieves data from the first table as of a time after the transaction committed.

8. The method of claim 1 wherein the step of generating a filter condition includes:
(a) publishing the query to disk;
(b) making the query visible at each of a plurality of database servers;
(c) obtaining and releasing an exclusive lock on each of the tables referenced in the query; and
(d) waiting until (a), (b) and (c) have completed before acquiring a snapshot time for an initial execution of the query.

9. The method of claim 1 wherein:
the step of determining whether the filter condition is satisfied is performed before the transaction commits; and
the step of determining a second set of queries is performed after the transaction commits.

10. The method of claim 1 wherein:
the step of determining whether the filter condition is satisfied is performed before the transaction commits; and
the step of determining a second set of queries is performed before the transaction commits.

11. The method of claim 1 wherein:
the step of determining whether the filter condition is satisfied is performed using a filter index;
the method further comprises the steps of
  reading a portion of the filter index into cache;
  maintaining data that indicates a first version of the filter index at the time at which the portion was read into cache;
  determining whether the filter condition is satisfied based on the portion; and
  determining whether the portion is stale by comparing the first version against data that indicates a second version of the filter index at the time that the transaction committed.

12. The method of claim 11 further comprising, in response to determining that the portion is stale, performing the steps of:
  loading a new portion of the filter index into cache; and
  recomputing the first set of the queries by based on undo log records and the new portion.

13. The method of claim 11 further comprising, in response to determining that the portion is stale, automatically establishing all registered queries that have filter conditions on said table as members of the first set of queries.

14. The method of claim 1 wherein the step of determining a second set of queries that have result sets that were actually affected by the transaction includes:
  constructing and executing delta queries for each query in the first set of queries to produce uncompressed query deltas; and
  executing compression queries over the uncompressed query deltas to determine if query result sets have changed.

15. A non-transitory computer-readable storage medium storing one or more sequences of instructions which, when executed by one or more processors, causes the one or more processors to perform the method recited in claim 1.

16. A non-transitory computer-readable storage medium storing one or more sequences of instructions which, when executed by one or more processors, causes the one or more processors to perform the method recited in claim 2.

17. A non-transitory computer-readable storage medium storing one or more sequences of instructions which, when executed by one or more processors, causes the one or more processors to perform the method recited in claim 3.

18. A non-transitory computer-readable storage medium storing one or more sequences of instructions which, when executed by one or more processors, causes the one or more processors to perform the method recited in claim 4.

19. A non-transitory computer-readable storage medium storing one or more sequences of instructions which, when executed by one or more processors, causes the one or more processors to perform the method recited in claim 5.

20. A non-transitory computer-readable storage medium storing one or more sequences of instructions which, when executed by one or more processors, causes the one or more processors to perform the method recited in claim 6.

21. A non-transitory computer-readable storage medium storing one or more sequences of instructions which, when executed by one or more processors, causes the one or more processors to perform the method recited in claim 7.

22. A non-transitory computer-readable storage medium storing one or more sequences of instructions which, when executed by one or more processors, causes the one or more processors to perform the method recited in claim 8.

23. A non-transitory computer-readable storage medium storing one or more sequences of instructions which, when executed by one or more processors, causes the one or more processors to perform the method recited in claim 9.

24. A non-transitory computer-readable storage medium storing one or more sequences of instructions which, when executed by one or more processors, causes the one or more processors to perform the method recited in claim 10.

25. A non-transitory computer-readable storage medium storing one or more sequences of instructions which, when executed by one or more processors, causes the one or more processors to perform the method recited in claim 11.

26. A non-transitory computer-readable storage medium storing one or more sequences of instructions which, when executed by one or more processors, causes the one or more processors to perform the method recited in claim 12.

27. A non-transitory computer-readable storage medium storing one or more sequences of instructions which, when executed by one or more processors, causes the one or more processors to perform the method recited in claim 13.

28. A non-transitory computer-readable storage medium storing one or more sequences of instructions which, when executed by one or more processors, causes the one or more processors to perform the method recited in claim 14.

\* \* \* \* \*

UNITED STATES PATENT AND TRADEMARK OFFICE
CERTIFICATE OF CORRECTION

| | | |
|---|---|---|
| PATENT NO. | : 8,037,040 B2 | Page 1 of 1 |
| APPLICATION NO. | : 12/189078 | |
| DATED | : October 11, 2011 | |
| INVENTOR(S) | : Vemuri et al. | |

It is certified that error appears in the above-identified patent and that said Letters Patent is hereby corrected as shown below:

In column 6, line 28, delete "Order_Lines:" and insert -- ORDER_LINES: --, therefor.

In column 8, line 19, delete "etc), The" and insert -- etc). The --, therefor.

In column 10, line 51, after "columns" insert -- . --.

In column 13, line 67, delete "relation ship." and insert -- relationship. --, therefor.

In column 14, line 1, delete "Tx2" and insert -- TX2 --, therefor.

In column 17, line 21, delete "DeltA_query" and insert -- Delta_query --, therefor.

In column 17, line 37, delete "but no" and insert -- but not --, therefor.

In column 19, line 26, delete "implict" and insert -- implicit --, therefor.

In column 22, line 56, in Claim 3, delete "include:" and insert -- includes: --, therefor.

Signed and Sealed this
Twenty-seventh Day of December, 2011

David J. Kappos
*Director of the United States Patent and Trademark Office*